United States Patent
Tsai

[19]

[11] Patent Number: 5,964,205
[45] Date of Patent: Oct. 12, 1999

[54] FUEL ATOMIZING DEVICE

[76] Inventor: Chin-Cheng Tsai, No. 37, Alley 97, Lane 85, An-Chang St., An-Nan Dist., Tainan, Taiwan

[21] Appl. No.: 09/127,782

[22] Filed: Aug. 3, 1998

[51] Int. Cl.[6] .................................................. F02M 33/00
[52] U.S. Cl. ............................................................ 123/538
[58] Field of Search ..................................... 123/536, 537, 123/538

[56] References Cited

U.S. PATENT DOCUMENTS

| | | | |
|---|---|---|---|
| 5,044,346 | 9/1991 | Tada et al. ............................... | 123/538 |
| 5,460,144 | 10/1995 | Park et al. ............................... | 123/538 |
| 5,632,254 | 5/1997 | Kim ........................................ | 123/538 |
| 5,873,353 | 2/1999 | Makita .................................... | 123/538 |

*Primary Examiner*—Marguerite McMahon
*Attorney, Agent, or Firm*—Sixeby, Friedman, Leedom & Ferguson; Stuart J. Friedman

[57] ABSTRACT

A fuel atomizing device includes a flexible sleeve which has far infrared ceramic powder impregnated therein and the flexible sleeve is mounted to the fuel line through which the fuel passes. The far infrared ceramic powder is heated by the engine and emits far infrared rays to atomize the fuel in the fuel line.

4 Claims, 2 Drawing Sheets

FUEL ATOMIZING DEVICE

FIELD OF THE INVENTION

The present invention relates to a fuel atomizing device, and more particularly, to a fuel line having far infrared emitting material mounted to the outer periphery thereof so as to minimize and atomize the fuel before entering an engine.

BACKGROUND OF THE INVENTION

In order to have better combustion in an engine, the fuel entering the engine is required to be atomized as much as possible. Referring to FIG. 4, a fuel atomizing device is developed which is connected in series with the fuel line 33 and comprises a treatment line 3 made of steel which is connected between two ends defined by cutting the fuel line 33, the treatment line 3 having two nipples 31 so as to securely insert into the two ends of the fuel line 33. A far infrared bar 30 which has far infrared material enclosed by glass is inserted into the treatment line 3 so that when the fuel passes through the treatment line 3, the far infrared ray will atomize the fuel then enters the engine. The far infrared material generally is called far infrared ceramic which easily emits far infrared rays when heated and the heat can come from the operating engine. However, the far infrared bar 30 is easily broken and debris could enter the engine. Therefore, the structure of the present fuel atomizing device is unstable. Furthermore, the far infrared bar 30 is expensive and the connections where the nipples 31 are inserted into the two ends of the fuel line 33 are difficult to seal properly.

The present invention has arisen to provide a fuel atomizing device which impregnates far infrared ceramic powder into the flexible line which is mounted to the fuel line. In this way, the fuel passing through the fuel line can be atomized by the far infrared rays generated from the far infrared ceramic powder such that the shortcomings described above can be mitigated.

SUMMARY OF THE INVENTION

In accordance with one aspect of the present invention, a fuel atomizing device is provided and comprises a flexible sleeve in which far infrared ceramic powder is impregnated and the sleeve is securely mounted to the fuel line.

An object of the present invention is to provide a fuel atomizing device which includes a sleeve having the far infrared ceramic powder impregnated therein and the sleeve is easily mounted to the fuel line.

Further objects, advantages, and features of the present invention will become apparent from the following detailed description with appropriate reference to the accompanying drawings.

DETAILED DESCRIPTION OF THE PREFERRED EMBODIMENTS

Figure 1:
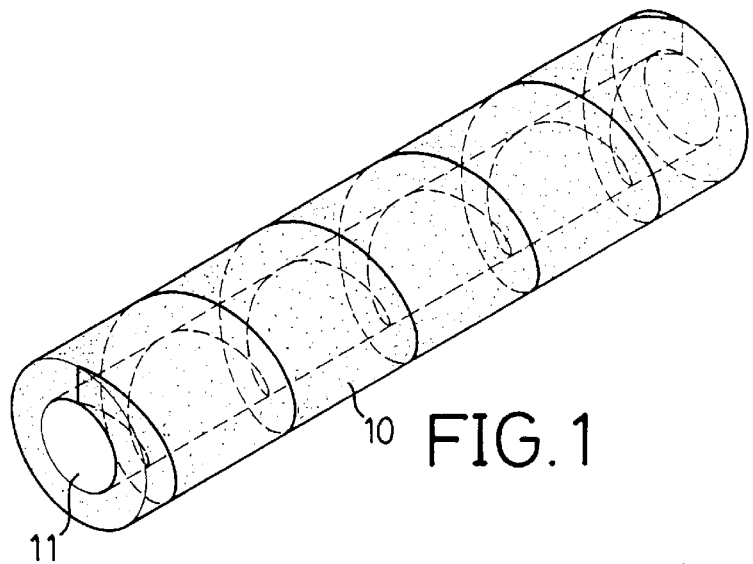
FIG. 1 is a perspective view of the sleeve in accordance with the present invention wherein the sleeve has the far infrared ceramic powder impregnated therein.
Figure 2:
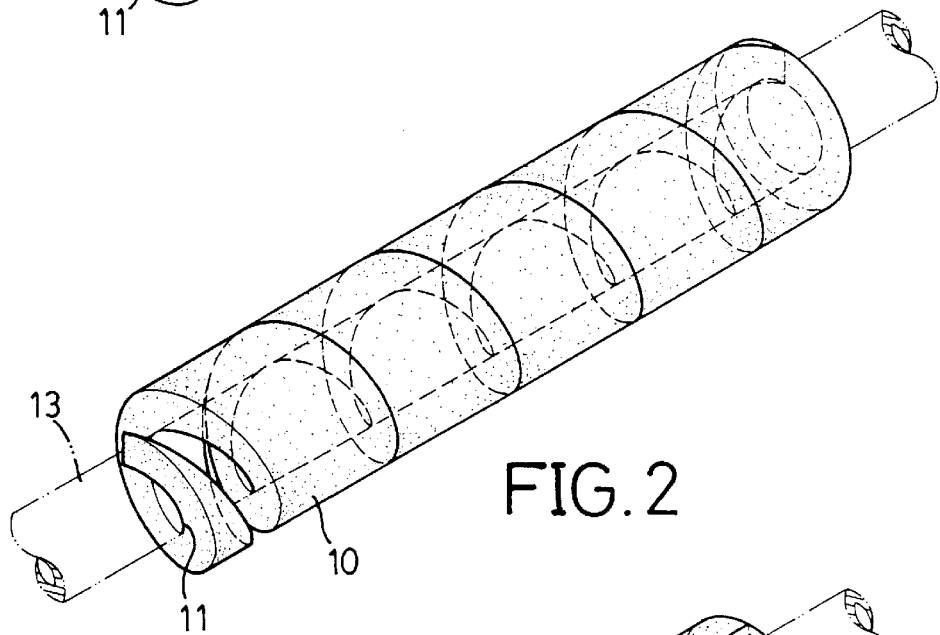
FIG. 2 is an illustrative view to show the sleeve of the present invention mounted to the fuel line.

Referring to FIGS. 1 and 2, the fuel atomizing device in accordance with the present invention comprises a flexible sleeve 10 which is made of rubber or other flexible material. The far infrared ceramic powder is impregnated in the sleeve 10 when forming the sleeve 10 which has a circular inner periphery 11 so that the fuel line 13 is received therein. The sleeve 10 is cut spirally through the peripheral wall thereof so that the sleeve 10 has a tendency to wrap around the fuel line 13 which does not need to be cut. In order to enhance the engagement between the sleeve 10 and the fuel line 13, the sleeve 10 can also be attached around the fuel line 13 with glue. Therefore, the sleeve 10 can be easily cut into sections and conveniently wrapped around any section of the fuel line 13. Furthermore, the fuel line 13 does not need to be cut into two parts which could result in leakage.

Figure 3:
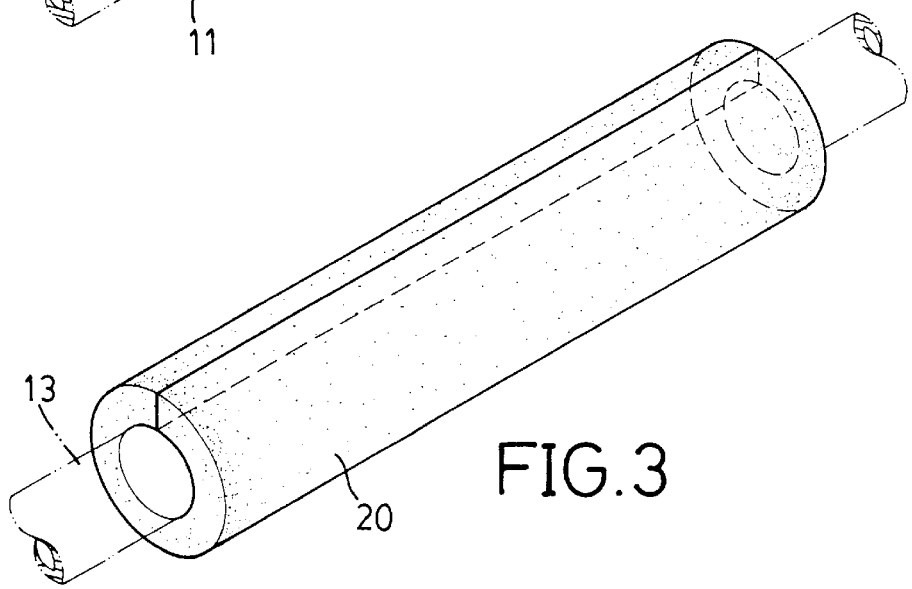
FIG. 3 is an illustrative view to show another embodiment of the sleeve mounted to the fuel line.
Figure 4:
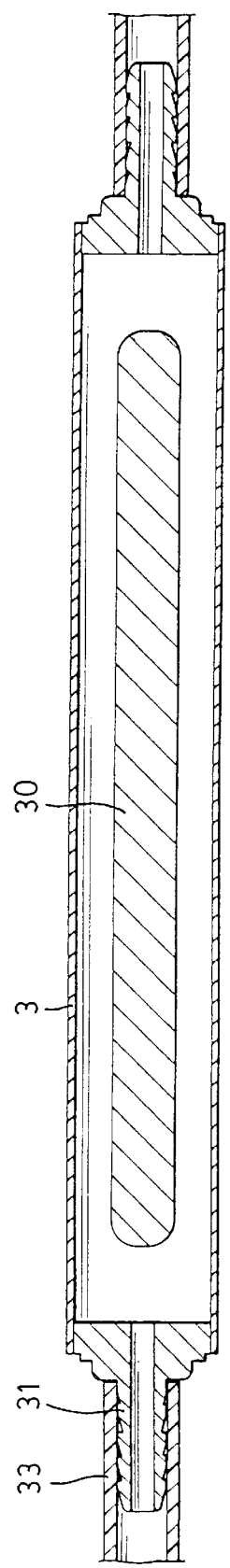
FIG. 4 is a side elevational view to show the conventional far infrared bar received in the fuel line.

FIG. 3 shows another embodiment of the sleeve 20 which is cut longitudinally so that the sleeve 20 is easier to mount to the fuel line 13.

Although the invention has been explained in relation to its preferred embodiment, it is to be understood that many other possible modifications and variations can be made without departing from the spirit and scope of the invention as hereinafter claimed.

What is claimed is:

1. A fuel atomizing device comprising:
   a flexible sleeve having far infrared ceramic powder impregnated therein, said sleeve adapted to mount a fuel line.

2. The fuel atomizing device as claimed in claim 1, wherein said sleeve is cut longitudinally through the peripheral wall thereof.

3. The fuel atomizing device as claimed in claim 1, wherein said sleeve is cut spirally.

4. The fuel atomizing device as claimed in claim 1, wherein said sleeve has a circular inner periphery.

* * * * *